United States Patent
Kanbara

(10) Patent No.: US 8,004,710 B2
(45) Date of Patent: Aug. 23, 2011

(54) PRINTING SYSTEM, PRINTING METHOD AND PRINTING PROGRAM

(75) Inventor: Kohji Kanbara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1255 days.

(21) Appl. No.: 11/366,023

(22) Filed: Mar. 2, 2006

(65) Prior Publication Data

US 2006/0197980 A1 Sep. 7, 2006

(30) Foreign Application Priority Data

Mar. 3, 2005 (JP) ................................. 2005-059332
Mar. 3, 2005 (JP) ................................. 2005-059333

(51) Int. Cl.
*G06K 15/00* (2006.01)
*G06F 3/12* (2006.01)

(52) U.S. Cl. ..................... 358/1.16; 358/1.15; 358/1.14; 358/1.17

(58) Field of Classification Search ........ 358/1.14–1.17; 713/202
See application file for complete search history.

(56) References Cited

U.S. PATENT DOCUMENTS

| | | | | |
|---|---|---|---|---|
| 5,673,373 A | * | 9/1997 | Nosaki et al. | 358/1.15 |
| 6,545,767 B1 | * | 4/2003 | Kuroyanagi | 358/1.14 |
| 7,110,132 B2 | * | 9/2006 | Takayanagi | 358/1.15 |
| 7,313,699 B2 | * | 12/2007 | Koga | 713/170 |
| 7,450,260 B2 | * | 11/2008 | Takeda et al. | 358/1.15 |
| 7,508,939 B2 | * | 3/2009 | Hashimoto | 380/51 |
| 7,586,635 B2 | * | 9/2009 | Maeda et al. | 358/1.15 |
| 7,639,379 B2 | * | 12/2009 | Enomoto et al. | 358/1.14 |
| 7,936,473 B2 | * | 5/2011 | Tatsumi | 358/1.15 |
| 2002/0062453 A1 | * | 5/2002 | Koga | 713/202 |
| 2004/0252347 A1 | | 12/2004 | Hosoya et al. | |

FOREIGN PATENT DOCUMENTS

| | | |
|---|---|---|
| JP | 10-271318 | 10/1998 |
| JP | 2001-318771 | 11/2001 |
| JP | 2003-008864 | 1/2003 |
| JP | 2004-252888 A | 9/2004 |
| JP | 2005-6169 | 1/2005 |
| JP | 2005-275953 A | 10/2005 |

OTHER PUBLICATIONS

Japanese Office Action mailed on Jan. 20, 2009 directed towards counterpart foreign application No. 2005-059333; 1 page.
Japanese Office Action mailed on Mar. 30, 2009 directed towards counterpart foreign application No. 2005-059333; 1 page.

* cited by examiner

*Primary Examiner* — James A Thompson
*Assistant Examiner* — Satwant Singh
(74) *Attorney, Agent, or Firm* — Morrison & Foerster LLP

(57) ABSTRACT

In a printing system, a document data transmitting unit transmits document data generated by a document generating device, to a document storing device. A document data transmission/reception unit receives the document data and transmits the received document data to a printer. A storing/monitoring unit detects whether document data is newly stored in a document storing device. A document data acquisition unit acquires the document data when it is detected that the document data is newly stored. A password input unit enters a print password for permitting printing of the document data. A printing unit prints the document data when the print password is correct.

7 Claims, 8 Drawing Sheets

PRINTING SYSTEM, PRINTING METHOD AND PRINTING PROGRAM

BACKGROUND OF THE INVENTION

1. Field of the Invention

The present invention relates to a printing system, a printing method and a printing program which facilitate printing of document data while ensuring the security of document data.

2. Description of the Related Art

In recent years, personal computers (PC) spread widely through the society as a whole, and they are indispensable to the society, such as increased efficiency of office work, exchange of mails between individuals, and electronic commerce technology. With the spreading of PC, many people are now capable of operating PC.

Therefore, because in almost all cases a person who can operate PC exists in the surroundings, even those who cannot operate PC can receive the benefit of PC by requesting the person to be the operator of PC.

However, a security-related problem arises when printing of document data which contains secret data confidential to the company or the like is performed. When the confidential document data is printed, requesting the unrelated person to be an operator of PC is impossible since there is a possibility that the confidential document data may leak to the outside. But it is also difficult for those who cannot operate PC to print document data.

Moreover, conventionally, as a means for suppression of copying data for printing, the ground tint is used. For example, the ground tint is used for a sheet for printing a certificate of the seal impression. In recent years, a copying machine which can superimpose a ground tint over document data having no ground tint and print the document data with the ground tint superimposed has been developed. See Japanese Laid-Open Patent Application No. 2004-252888

However, in order to superimpose the ground tint on the document data and print it with the conventional copying machine, the user must set up the superimposing of the ground tint for every print job, or must set up the superimposing of the ground tint for all the print jobs of printing document data.

When the superimposing of the ground tint is set up for every print job, the user has to judge whether it is document data on which the ground tint should be superimposed. And the user must perform the manual operation, and it is difficult for the user to make an exact judgment in any case.

When the superimposing of the ground tint is set up for all the print jobs, the document data with the ground tint superimposed is always printed on the copy sheet even in a case in which the superimposing of the ground tint is not needed. There is a problem in that the reproduced image on the copy sheet may be concealed by the unnecessary ground tint, and it is hard for the user to see the image of the original document.

SUMMARY OF THE INVENTION

An object of the present invention is to provide an improved printing system in which the above-described problems are eliminated.

Another object of the present invention is to provide a printing system and a printing method which facilitate printing of document data while ensuring the security of document data.

Another object of the present invention is to provide a ground-tint printing system and a ground-tint printing method which automatically print the ground tint in accordance with the user's request.

In order to achieve the above-mentioned objects, the present invention provides a printing system comprising a document generating device which generates document data, a document storing device which stores the document data, and a printer which prints the document data stored by the document storing device, the document generating device comprising a document data transmitting unit transmitting the generated document data to the document storing device, the document storing device comprising: a document data transmission/reception unit receiving the document data from the document generating device and transmitting the received document data to the printer; and a document data storing unit storing the received document data, the printer comprising: a storing/monitoring unit detecting whether document data is newly stored in the document storing device; a document data acquisition unit acquiring the document data when it is detected by the storing/monitoring unit that the document data is newly stored in the document storing device; a password input unit entering a print password for permitting printing of the acquired document data, which is inputted by a user; and a printing unit printing the acquired document data when the print password entered by the password input unit is correct.

In order to achieve the above-mentioned objects, the present invention provides a printing method for use in a printing system comprising a document generating device which generates document data, a document storing device which stores the document data, and a printer which prints the document data stored by the document storing device, the printing method comprising: a document data transmitting step of transmitting the document data generated by the document generating device, to the document storing device; a document data transmission/reception step of receiving the document data from the document generating device at the document storing device and transmitting the received document data from the document storing device to the printer; a document data storing step of storing the received document data in the document storing device; a storing/monitoring step of detecting whether document data is newly stored in the document storing device; a document data acquisition step of acquiring the document data at the printer when it is detected by the storing/monitoring unit that the document data is newly stored in the document storing device; a password input step of entering a print password for permitting printing of the acquired document data, which is inputted by a user; and a printing step of printing the acquired document data when the print password entered by the password input unit is correct.

In order to achieve the above-mentioned objects, the present invention provides a ground-tint printing system which superimposes a ground tint on document data and prints the document data, the ground-tint printing system comprising: a key information detecting unit detecting, from document data, key information which indicates that a ground tint is to be superimposed on the document data and printed; a ground-tint superposing unit superimposing the ground tint on the document data when the key information detecting unit detects the key information; and a printing unit printing the document data on which the ground tint is superimposed.

In order to achieve the above-mentioned objects, the present invention provides a ground-tint printing method which superimposes a ground tint on document data and prints the document data, the ground-tint printing method comprising: a key information detecting step of detecting, from document data, key information which indicates that a ground tint is to be superimposed on the document data and printed; a ground-tint superimposing step of superimposing the ground tint on the document data when the key information is detected in the key information detecting step; and a printing step of printing the document data on which the ground tint is superimposed.

According to the present invention, it is possible to provide a printing system and a printing method which can easily print document data while ensuring the security of document data. Moreover, according to the present invention, it is possible to provide a ground-tint printing system and a ground-tint printing method which automatically print the ground tint in accordance with the user's request.

BRIEF DESCRIPTION OF THE DRAWINGS

Other objects, features and advantages of the present invention will be apparent from the following detailed description when reading in conjunction with the accompanying drawings.

DETAILED DESCRIPTION OF PREFERRED EMBODIMENTS

A description will now be given of an embodiment of the invention with reference to the accompanying drawings.

Figure 1:
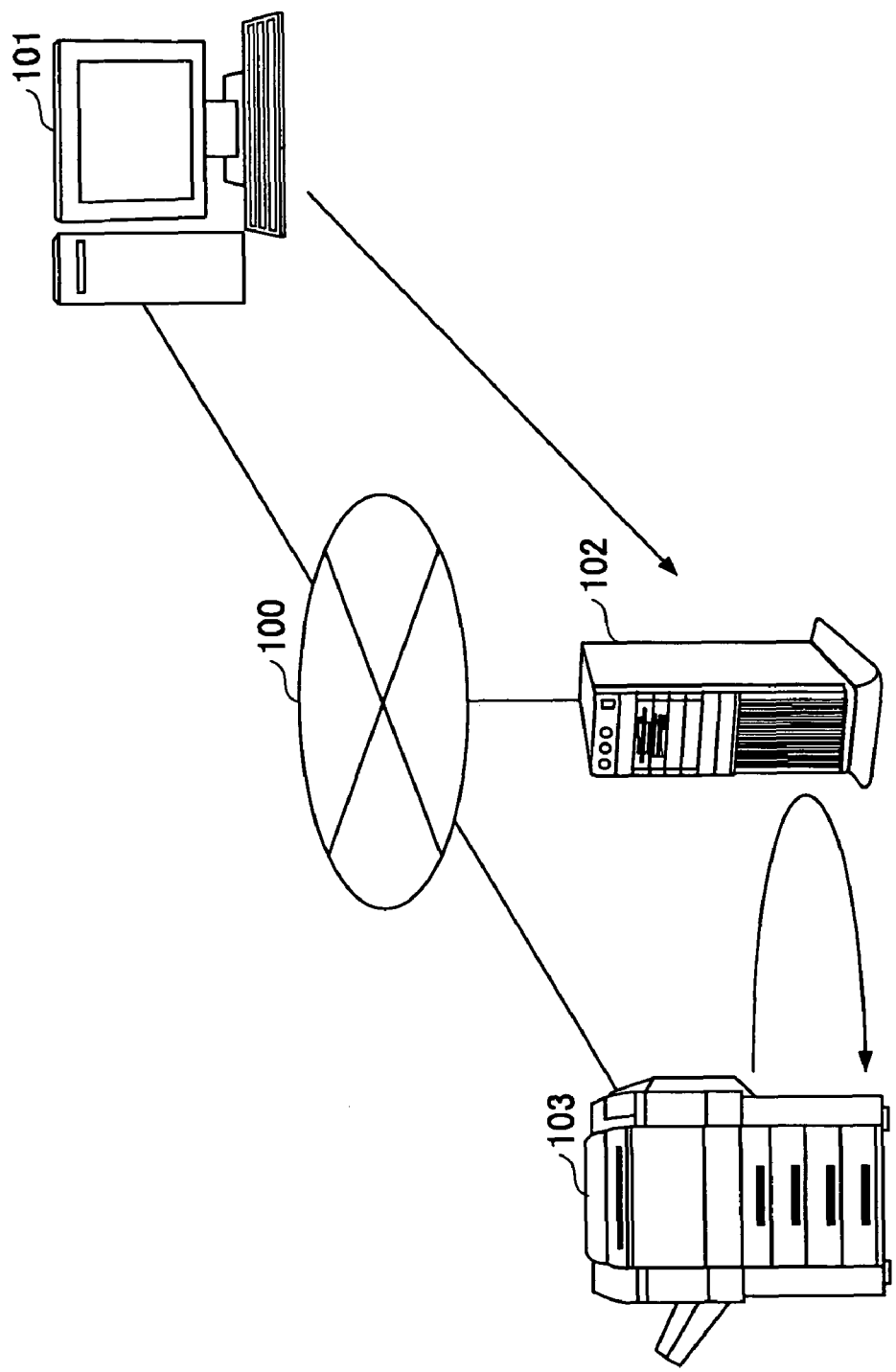
FIG. 1 is a diagram showing the composition of a printing system in an embodiment of the invention.

FIG. 1 shows the composition of a printing system in an embodiment of the invention.

As shown in FIG. 1, a PC 101, a file server 102 and a MFP (multi-function peripheral) 103 are connected together through a network 100.

The PC 101, which corresponds to a document generating device, generates document data, such as confidential document data, and transmits the generated document data to the file server 102 via the network 100. The PC 101 may be configured to transmit document data periodically at intervals of a given period.

The file server 102, which corresponds to a document storing device, stores the document data received from the PC 101 in a storing location which is specified beforehand, and transmits the stored document data to the MFP 103 according to the request from the MFP 103. For example, the storing location means a specific folder of a file system provided in the file server 102.

The MFP 103, which corresponds to a printer, monitors the storing location of the file server 102. When it is detected that the document data has been stored, the MFP 103 acquires the document data from the file server 102. And if the user inputs a print password for permitting the user to print the document data, the MFP 103 is caused to print out the acquired document data.

It is not necessarily to use the MFP 103 in the printing system. Alternatively, an image forming device, such as a normal laser printer, which is capable of inputting an arbitrary character string and printing document data may be used instead of the MFP 103.

A reading password for opening the document data is given beforehand to the document data which is generated by the PC 101, and the MFP 103 is able to open the document data by automatically inputting the reading password. It is necessary that the reading password is beforehand specified between the MFP 103 and the PC 101. Alternatively, the reading password may be shared by the MFP 103 and the PC 101 by using the known common-key transmission method.

In the present embodiment, the document data transmitted in the communication path between the PC 101 and the file server 102 and the document data transmitted in the communication path between the file server 102 and the MFP 103 are enciphered by using the IPsec, the SSL, etc., and it is possible to secure the security of document data at a higher level.

Next, the hardware composition of the PC 101 or the file server 102 will be explained with reference to FIG. 2.

Figure 2:
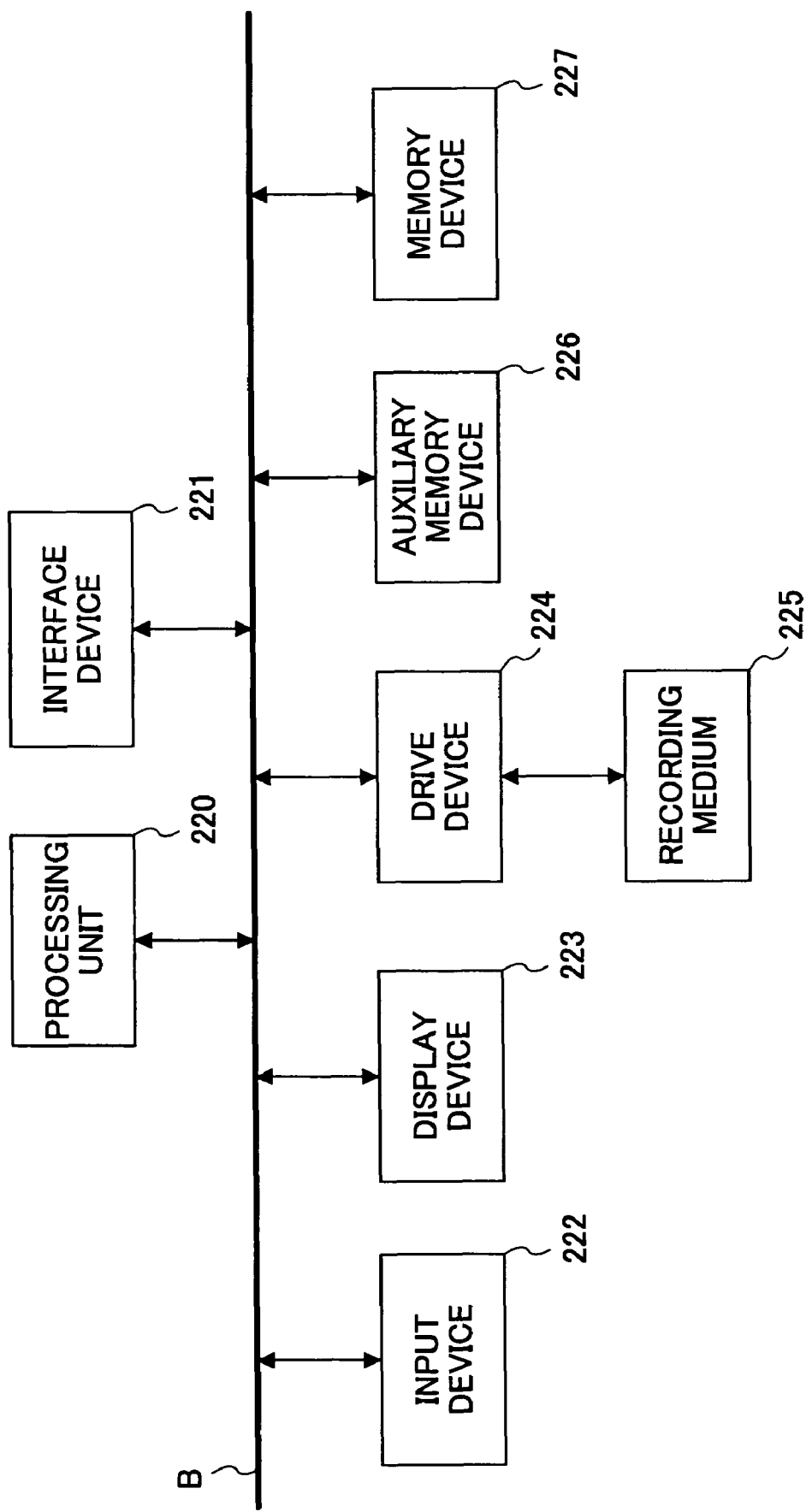
FIG. 2 is a diagram showing the hardware composition of a personal computer (PC) or a file server to which the printing system of the invention is applied.

As shown in FIG. 2, each of the PC 101 and the file server 102 comprises an input device 222, a display device 223, a drive device 224, a recording medium 225, an auxiliary memory device 226, a memory device 227, a processing unit 220, and an interface device 221, which are mutually connected by the bus B.

The input device 222 comprises a keyboard, a mouse, etc., and it is used in order to input various operational signals.

The display 223 displays various operational windows, data, etc. required to operate the PC 101 of the file server 102.

The interface device 221 is an interface for connecting the PC 101 or the file server 102 to the network or an interface for connecting other external devices to the PC 101 or the file server 102. For example, the interface device 221 is constituted by a NIC (Network Interface Card), a modem, a USB (Universal Serial Bus) device, etc.

The program for causing the PC 101 or the file server 102 to execute a printing method of the invention may be provided by the recording medium 225, such as a CD-ROM, or may be downloaded through the network.

The recording medium 225 is set in the drive device 224, and the data and the program from the recording medium 225 are installed in the auxiliary memory device 226 through the drive device 224.

The auxiliary memory device 226 stores the data and the program, and also stores the required files, etc. At the time of startup of the computer system, the program is read from the auxiliary memory device 226 and stored into the memory device 227. The processing unit 220 performs the processing according to the program read and stored in the memory device 227.

Next, the hardware composition of the MFP will be explained with reference to FIG. 3.

Figure 3:
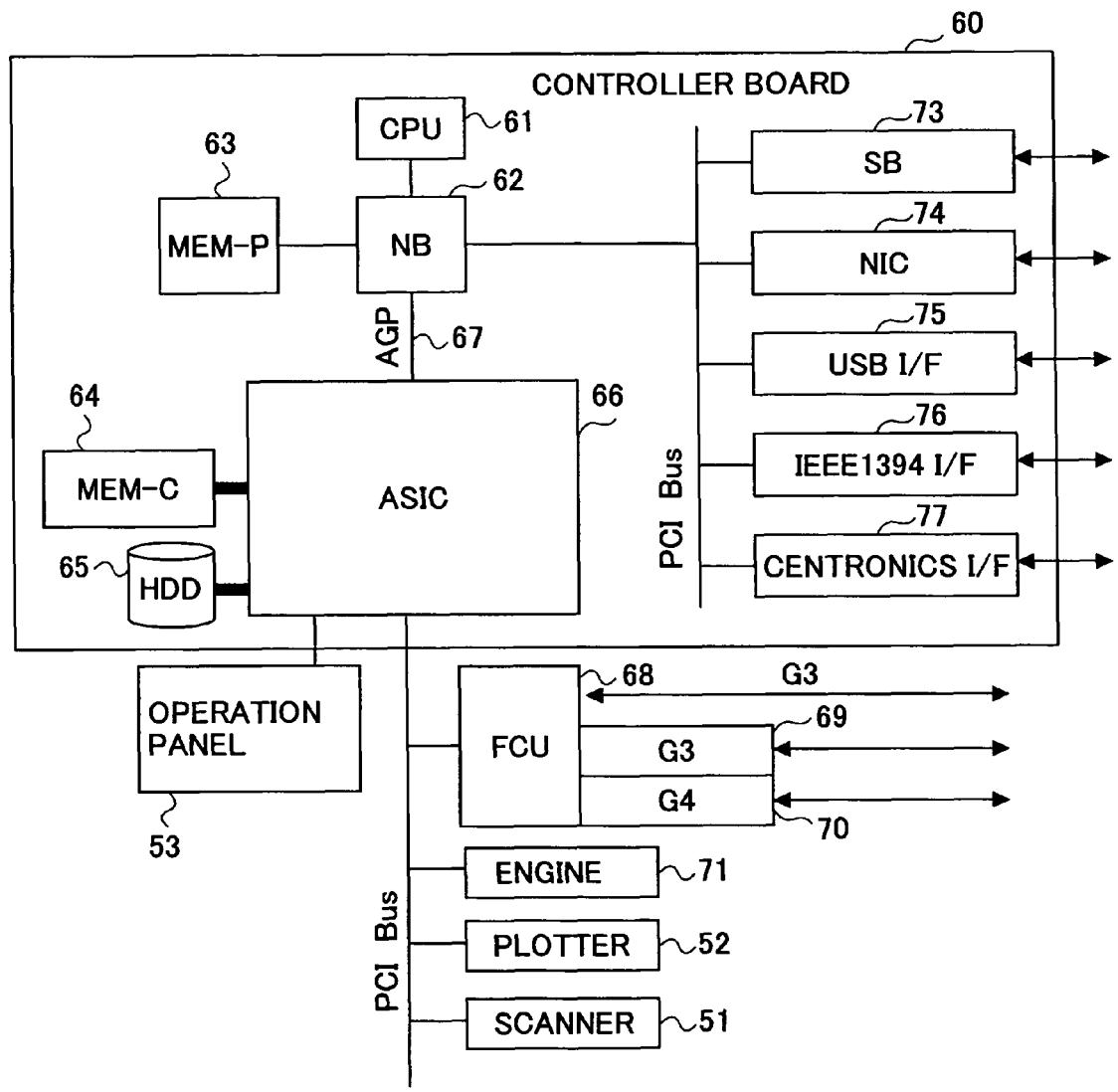
FIG. 3 is a diagram showing the hardware composition of a multi-function peripheral (MFP) to which the printing system of the invention is applied.

As shown in FIG. 3, the MFP comprises a controller board 60, an operation panel 53, a FCU 68, an engine 71, a scanner 51, and a plotter 52. The FCU 68 has a fax unit 69 conforming to the G3 standard, and a fax unit 70 conforming to the G4 standard.

The controller board 60 comprises a CPU 61, an ASIC 66, a HDD 65, a local memory (MEM-C) 64, a system memory (MEM-P) 63, a north bridge (called NB) 62, a south bridge (called SB) 73, a NIC (Network Interface Card) 74, a USB interface 75, an IEEE 1394 interface 76, and a Centronics interface 77.

The operation panel 53 is connected to the ASIC 66 of the controller board 60. The SB 73, the NIC 74, the USB interface 75, the IEEE 1394 interface 76, and the Centronics interface 77 are connected to the NB 62 via the PCI bus. The FCU 68, the engine 71, the scanner 51 and the plotter 52 are connected to the ASIC 66 of the controller board 60 via the PCI bus.

The controller board 60 is provided so that the local memory 64, the HDD 65, etc. are connected to the ASIC 66, and the CPU 61 and the ASIC 66 are connected via the NB 62 of the CPU chip set. Thus, if the CPU 61 and the ASIC 66 are connected via the NB 62, it is possible to take appropriate measures again the case in which the interface of the CPU 61 is not published.

The ASIC 66 and the NB 62 are connected together via an AGP (Accelerated Graphics Port) 67, not via the PCU bus. In order to control the execution of one or more processes, the connection between the ASIC 66 and the NB 62 is established via the high-speed AGP 67, not via the low-speed PCI bus. Thus, it is possible to prevent the performance from being lowered.

The CPU 61 is provided to perform control of the whole MFP. The CPU 61 starts execution of the program as a process by loading it on the OS, and performs the execution of the process. The NB 62 is a bridge for connecting the CPU 61, the system memory 63, the SB 73 and the ASIC 66 together. The system memory 63 is a memory used as the memory for image drawing of the MFP. The SB 73 is a bridge for connecting the NB 62, the PCI buses and the peripheral devices. The local memory 64 is a memory used as the image buffer for copying or the code buffer.

The ASIC 66 is an application-specific IC for image-processing applications having the hardware elements for image processing. The HDD 65 is a storage device for accumulating image data, for accumulating document data, for accumulating programs, for accumulating font data, for accumulating form data, etc. The operation panel 53 is an operation unit which receives the input operation from the user and performs the displaying of operational information to the user.

Next, the software composition of the MFP will be explained with reference to FIG. 4.

Figure 4:
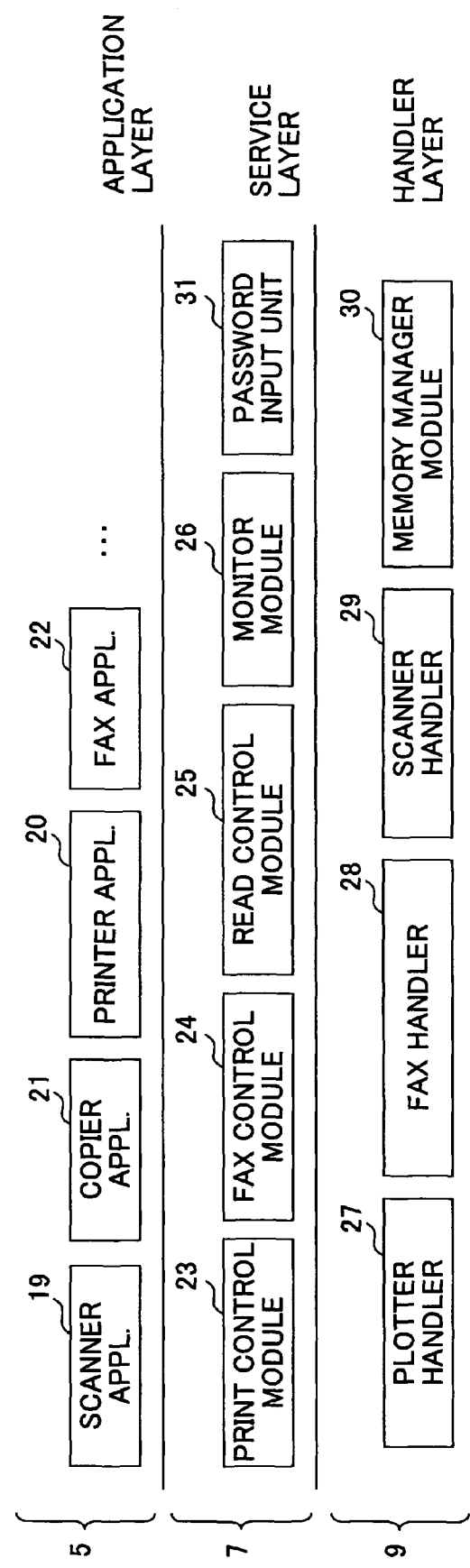
FIG. 4 is a diagram showing the software composition of the MFP.

The software composition shown in FIG. 4 is divided into three layers of an application layer 5, a service layer 7, and a handler layer 9.

The application layer 5 includes programs of a scanner application 19, a copy application 21, a printer application 20, and a fax application 22. The service layer 7 includes programs of a print control module 23, a fax control module 24, a read control module 25, a monitor module 26, and a password input module 31. The handler layer 9 includes programs of a plotter handler 27, a fax unit handler 28, a scanner handler 29, and a memory manager module 30.

The scanner application 19, the copy application 21, the printer application 20, and the fax application 22 of the application layer 5 are application programs for scanner, for copier, for printer, and for fax, respectively. Among these application programs, the printer application 20 corresponds to a printing unit.

Next, the modules of the service layer 7 will be explained.

The print control module 23 is a module which controls the printing job. The fax control module 24 is a module which controls the fax processing. The read control module 25 is a module which controls the reading processing. The monitor module 26 is a module which detects whether document data is newly stored in the file server. If it is checked that the document data has been stored, then the monitor module 26 acquires the document data. The monitor module 26 corresponds to a storing/monitoring unit.

The password input module 31 is a module for entering a print password for permitting printing of document data, which is inputted by the user. If the print password inputted by the user is correct, the password input module 31 notifies to the printer application 20 that the correct print password is inputted by the user.

Next, the programs of the handler layer 9 will be explained.

The programs of handler layer 9 are handlers of the plotter and the scanner which are the hardware units. The plotter handler 27 is a handler of the plotter. The fax handler 28 is a handler of the fax unit. The scanner handler 29 is a handler of the scanner. The memory manager module 30 is a handler which performs management of the memory or the hard disk.

Next, the software composition of the file server will be explained with reference to FIG. 5.

Figure 5:
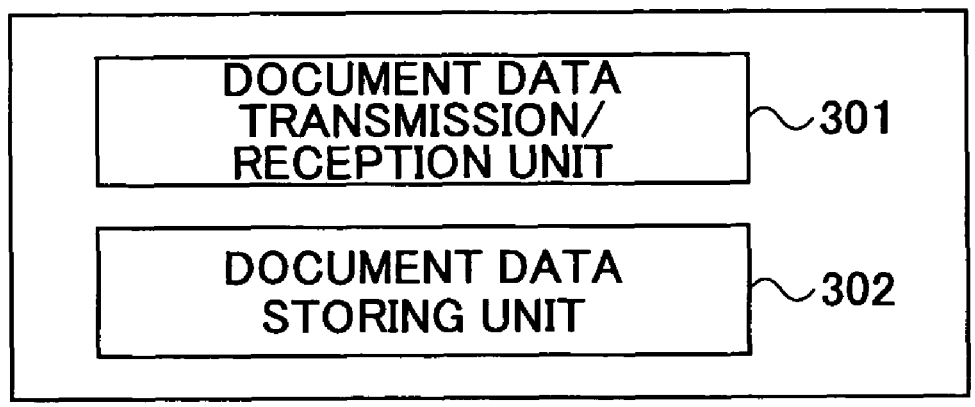
FIG. 5 is a diagram showing the software composition of the file server.

As shown in FIG. 5, the software composition of the file server comprises a document data transmission/reception unit 301 and a document data storing unit 302.

The document data transmission/reception unit 301, which corresponds to a document data transmission/reception unit, receives document data from the PC and transmits the document data to the MFP. The document data storing unit 302 stores the document data during the period between the reception and the transmission. Therefore, the file server of the present embodiment may be configured by a file server provided with the normal functions of document data handling.

Next, the software composition of the PC will be explained with reference to FIG. 6.

Figure 6:
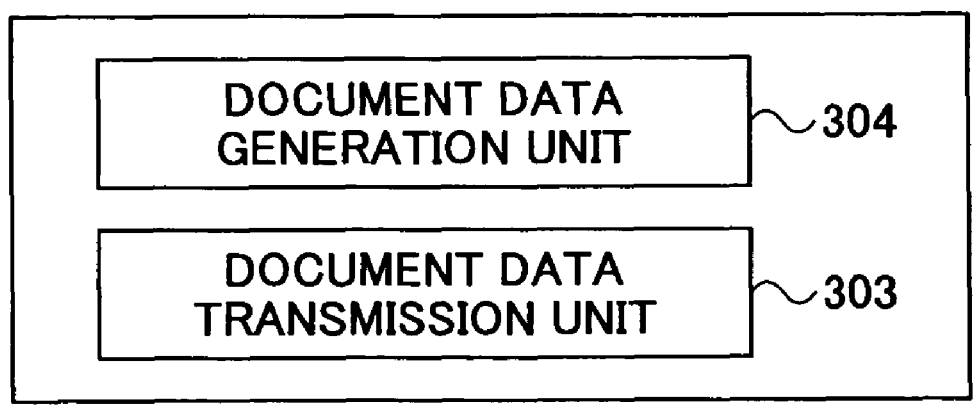
FIG. 6 is a diagram showing the software composition of the PC.

As shown in FIG. 6, the software composition of the PC comprises a document data generation unit 304 and a document data transmission unit 303.

The document data generation unit 304 generates document data on the PC. For example, the document data may be generated on the PC by using the word-processing software, or receiving the document data from another PC.

The document data transmission unit 303, which corresponds to a document data transmitting unit, transmits the document data generated by the document data generation unit 304, to the file server. For example, the transmission of the document data may be performed periodically at intervals of a given time by using a timer.

Next, the processing from the acquisition of document data to the printing of the document data by the MFP will be explained with reference to FIG. 7.

Figure 7:
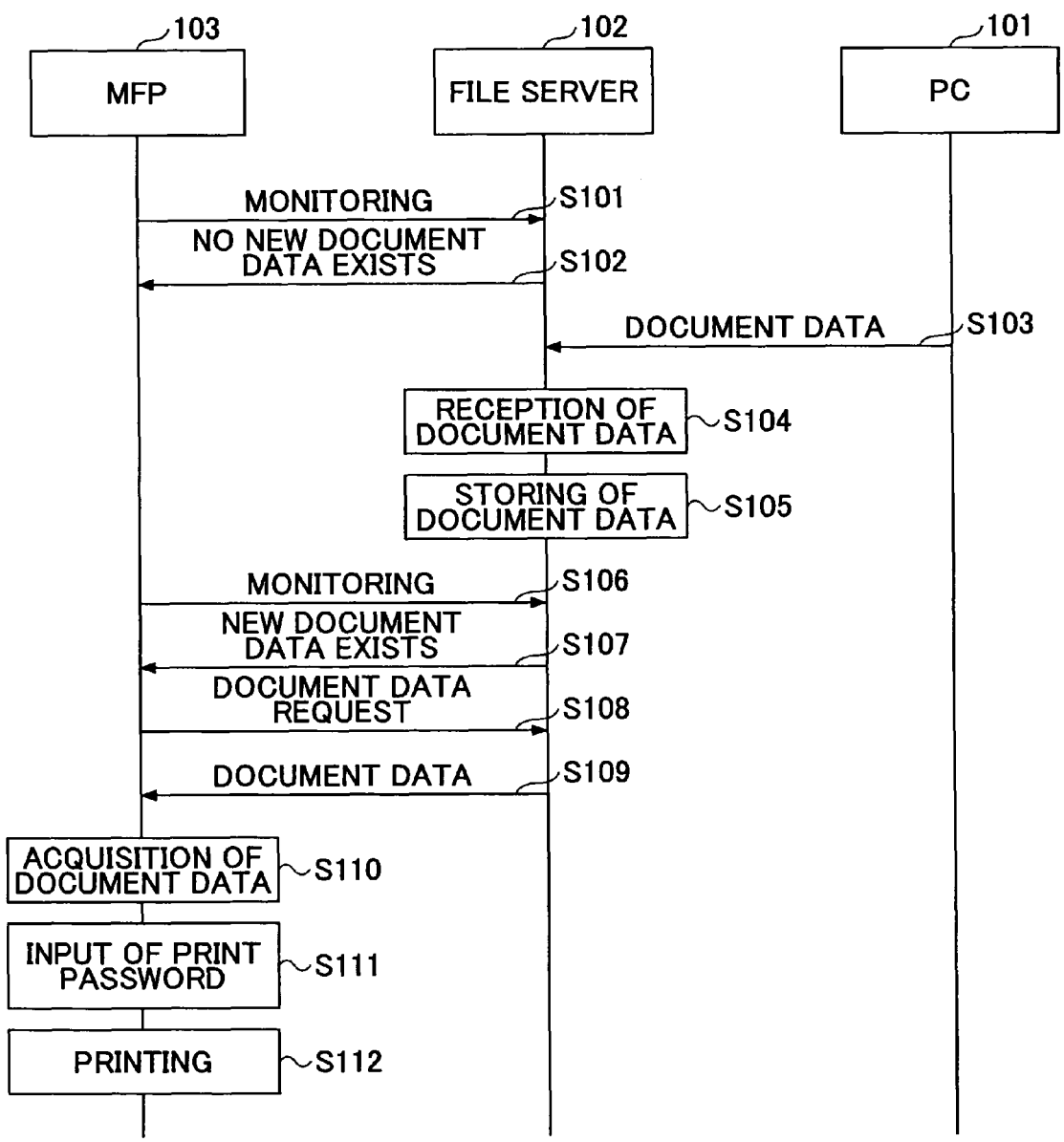
FIG. 7 is a sequence diagram for explaining a printing procedure which is performed by the printing system of the present embodiment.

FIG. 7 is a sequence diagram for explaining the processing which is performed between the PC 101, the MFP 103 and the file server 102.

At step S101, the MFP 103 monitors whether document data is newly stored in the file server 102. In response to the inquiry from the MFP 103, the file server 102 sends at step S102 the notification that there is no new document data. The steps S101 and S102 are performed periodically. The step S101 corresponds to a storing/monitoring step.

The PC 101 transmits at step S103 the generated document data to the file server 102. The step S103 corresponds to a document data transmitting step. The file server 102 receives at step S104 the document data from the PC 101. The step S104 corresponds to a document data receiving step.

And the file server 102 stores at step S105 the document data therein. The step S105 corresponds to a document data storing step.

At step S106, the MFP 103 monitors again whether document data is newly stored in the file server 102. Since the document data is stored at the step S105, the file server 102 transmits at step S107 the notification that the new document data exists to the MFP 103. Thereby, since it is checked that the document data has been stored, the MFP 103 transmits at step S108 a document data request to the file server 102.

The file server 102 transmits at step S109 the document data to the MFP 103. Thereby, the MFP 103 acquires the document data at step S110. The step S110 corresponds to a document data acquisition step.

Next, at step S111, the MFP 103 requests the user to input the print password for permitting printing of the acquired document data, so that the print password is entered into the MFP 103 by the user. The step S111 corresponds to a print password input step.

When the entered print password is correct, the MFP 103 is caused to print the document data at step S112. The step S112 corresponds to a printing step.

Next, the composition of a ground-tint printing system in another embodiment of the invention will be explained with reference to FIG. 8.

Figure 8:
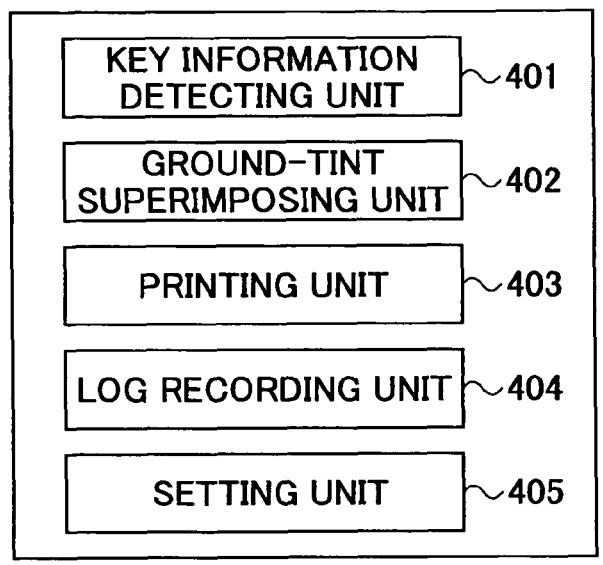
FIG. 8 is a diagram showing the software composition of a ground-tint printing system in another embodiment of the invention.

As shown in FIG. 8, this ground-tint printing system comprises a key information detecting unit 401, a ground tint superimposing unit 402, a printing unit 403, a log recording unit 404, and a setting unit 405.

The key information detecting unit 401 detects, from the document data, key information which indicates that a ground tint is superimposed and printed. The key information detecting unit 401 performs a character recognition or image recognition of the document data, and detects from the document data the key information which registered in a key information database (which will be called key database).

When the key information detecting unit 401 detects the key information, the ground tint superimposing unit 402 generates the document data on which the ground tint is superimposed on the ground tint by superimposing the ground tint on the document data. The ground tint superimposing unit 402 superimposes, as the ground tint, user information related to the user who performs printing, or time information related to the time that printing of the document data is performed. The user information may contain a user name, a user ID, etc., for example. The time information may contain a day and time of execution of printing of the document data, for example.

The printing unit 403 prints the document data on which the ground tint is superimposed or prints the ordinary document data. The log recording unit 404 records a log which indicates that the document data on which the ground tint is superimposed by the ground tint superimposing unit 402 is printed. The setting unit 405 sets up parameters for setting registration of the key information, for setting performance of the log recording, for setting performance of superimposing the user information as the ground tint, and for setting performance of superimposing the time information as the ground tint.

The ground-tint printing system as a whole is constituted by the above-described units. There are various methods of installing the respective units into any of the components of the PC (personal computer) or the MFP (multi-function peripheral).

For example, in the composition of the MFP of FIG. 4, the key information detecting unit 401, the ground tint superimposing unit 402, the printing unit 403, and the log recording unit 404 may be installed in the MFP. Therefore, in the case of the MFP of FIG. 4, if the document data is stored in the MFP, then the composition of the PC and the file server will become unnecessary. Moreover, in the case of the MFP of FIG. 4, if the document data is stored in the PC, then the composition of the file server will become unnecessary.

In the case of the composition of the file server, the key information detecting unit 401 and the ground tint superimposing unit 402 may be installed in the file server. In this case, the file server detects the key information from the document data transmitted by the PC, and the MFP performs printing of the document data on which the ground tint is superimposed.

Next, the key database will be explained with reference to FIG. 9. As an example of the key database, a database of character string information and a database of image information will be explained.

Figure 9:
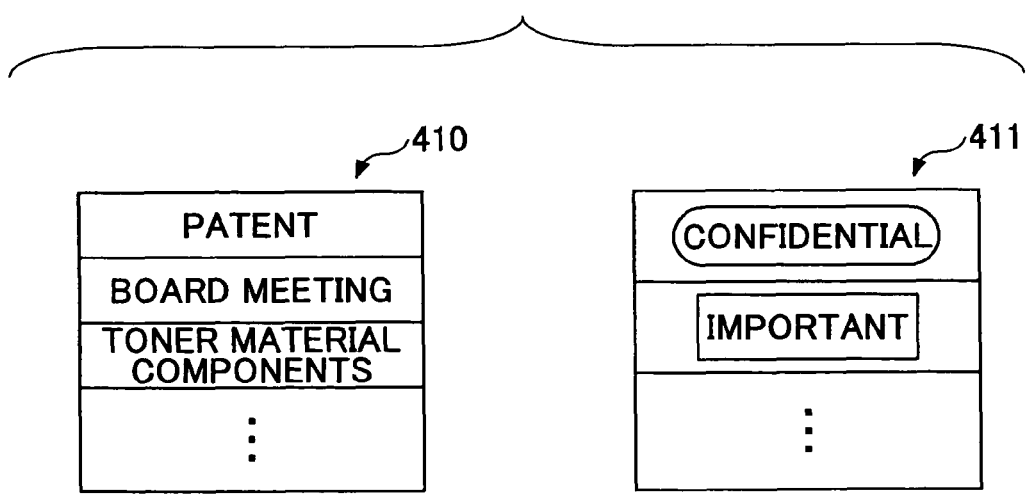
FIG. 9 is a diagram showing a key information database.

In FIG. 9, a character information database 410 and an image information database 411 are shown. The key information detecting unit performs the character recognition of the document data, so that the recognized character string is registered in the character information database 410. The character information database 410 is used to detect from the document data the character string registered in the character information database 410.

In the example of the character information database 410 of FIG. 9, there is shown the key information including character strings, such as "patent", which is registered in the character information database 410. In this case, the key information detecting unit detects this character string as the key information, if the character string "patent" exists in the document data.

As described above, the key information detecting unit performs the image recognition of the document data, so that the recognized image is registered in the image information database 411. And the image information database 411 is used to detect from the document data the image registered in the image information database 411.

In the example of the image information database 411 of FIG. 9, there is shown the key information including the image "confidential" which is registered in the image information database 411. In this case, the key information detecting unit detects this image as the key information, if the image "confidential" exists in the document data.

Next, a ground-tint printing procedure will be explained with reference to FIG. 10.

Figure 10:
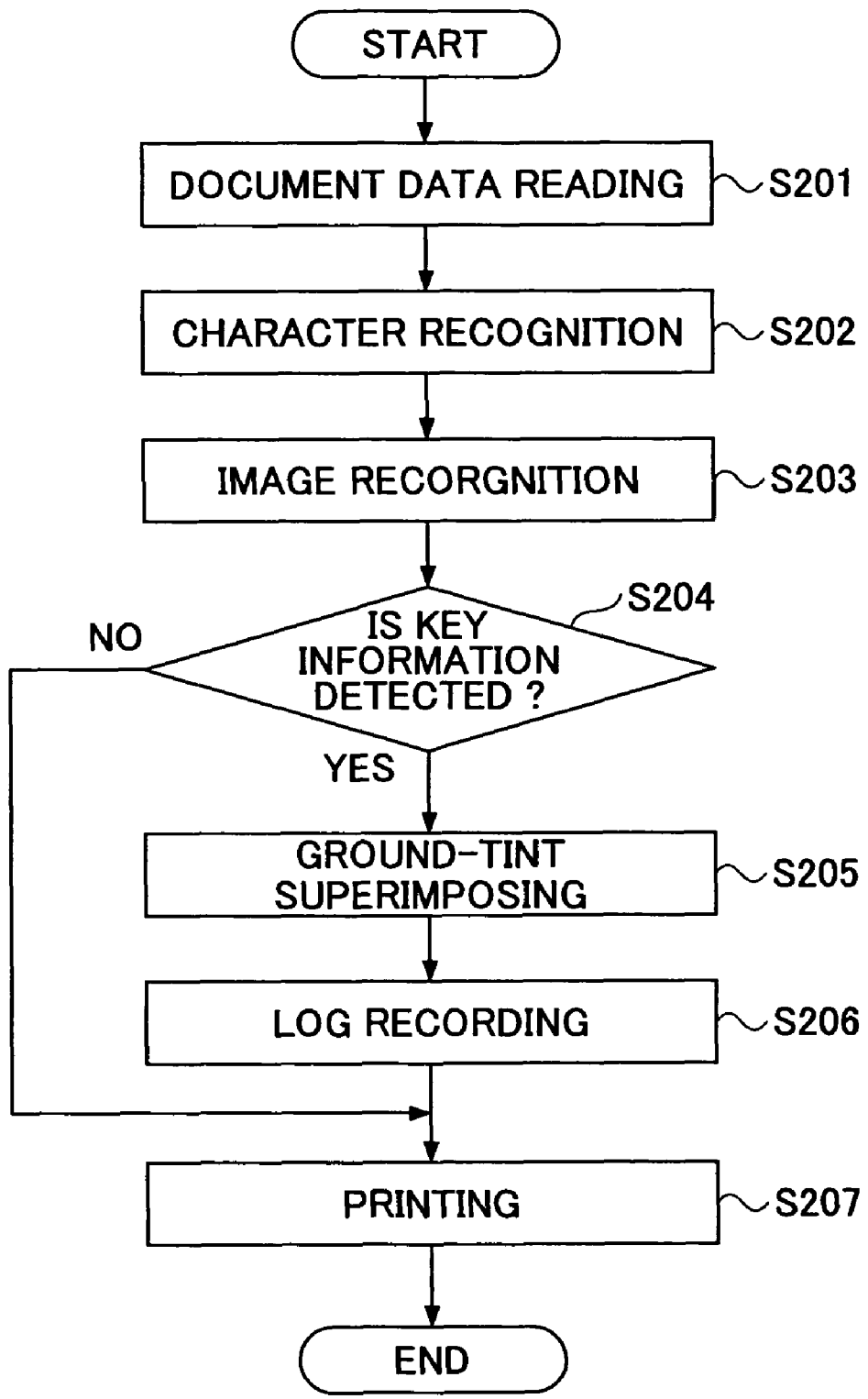
FIG. 10 is a flowchart for explaining a ground-tint printing procedure which is performed by the ground-tint printing system of the present embodiment.

FIG. 10 is a flowchart for explaining the ground-tint printing procedure which is performed by the ground-tint printing system of this embodiment. Although the components of the ground-tint printing system which performs the steps of the printing procedure may differ for every step, the printing procedure may be performed through the network in that case.

As shown in FIG. 10, the ground-tint printing system performs the document data reading processing at step S201. At step S202, the ground-tint printing system performs the character recognition processing of the document data. At step S203, the ground-tint printing system performs the image recognition processing of the document data.

At step S204, the ground-tint printing system determines whether the key information is detected as a result of the above-mentioned character recognition processing or the above-mentioned image recognition processing. If it is determined at step S204 that no key information is detected, the processing progresses to step S207.

If it is determined at step S204 that the key information is detected, the ground-tint printing system performs at step S205 the ground tint superimposing processing. At this time, both the user information and the time information may be superimposed as the ground tint.

The ground-tint printing system performs at step S206 the log recording processing. And the ground-tint printing system performs at step S207 the printing processing of the document data on which the ground tint is superimposed.

The above-mentioned steps S202 and S203 correspond to a key information detecting step. The step S205 corresponds to a ground tint superposition step. The step S207 corresponds to a printing step.

In the above-described embodiment, it is no longer necessary to set up the superimposing of the ground tint for every print job. Since the key information is registered in the key database, the superimposing of the ground tint to document data on which the ground tint must be superimposed can be automatically carried out while the security of the document data when performing printing of the document data can be maintained. Since the user who performs the printing and the time of execution of the printing can be specified, the leaking of confidential information can be suppressed.

The present invention is not limited to the above-described embodiments, and variations and modifications may be made without departing from the scope of the present invention.

Further, the present application is based on and claims the benefit of priority of Japanese patent application No. 2005-059332, filed on Mar. 3, 2005, and Japanese patent application No. 2005-059333, filed on Mar. 3, 2005, the entire contents of which are hereby incorporated by reference.

What is claimed is:

1. A printing system comprising a document generating device which generates document data, a document storing device which stores the document data, and a printer which prints the document data stored by the document storing device, the document generating device being connected to the printer via a network and comprising a document data transmitting unit transmitting the generated document data to the document storing device via the network, the document storing device being connected to the printer via the network and comprising:

a document data transmission/reception unit receiving the document data from the document generating device via the network and transmitting the received document data to the printer via the network; and a document data storing unit storing the received document data, the printer comprising:

a storing/monitoring unit detecting whether document data is newly stored in the document storing device;

a document data acquisition unit acquiring the document data from the document storing device via the network when it is detected by the storing/monitoring unit that the document data is newly stored in the document storing device;

a password input unit entering a print password for permitting printing of the acquired document data, which is inputted by a user; and a printing unit printing the acquired document data when the print password entered by the password input unit is correct, wherein a reading password for permitting opening of the document data stored in the document storing device is given to the document data when generated by the document generating device, wherein before the document data is acquired by the printer from the document storing device via the network, the printer performs an automatic input of the reading password to open the document data stored in the document storing device, and wherein the reading password is prespecified between the printer and the document generating device.

2. The printing system according to claim 1 wherein the document data transmitting unit is provided to transmit the document data to the document storing device periodically.

3. The printing system according to claim 1 wherein the document data transmitted in a communication path between the document generating device and the document storing device, and the document data transmitted in a communication path between the document storing device and the printer are enciphered.

4. A printing method for use in a printing system comprising a document generating device which generates document data, a document storing device which stores the document data, and a printer which prints the document data stored by the document storing device, the printing method comprising:

a document data transmitting step of transmitting the document data generated by the document generating device to the document storing device via a network;

a document data transmission/reception step of receiving the document data from the document generating device at the document storing device and transmitting the received document data from the document storing device to the printer via the network;

a document data storing step of storing the received document data in the document storing device;

a storing/monitoring step of detecting whether document data is newly stored in the document storing device;

a document data acquisition step of acquiring, at the printer, the document data from the document storing device via the network when it is detected by the storing/monitoring unit that the document data is newly stored in the document storing device;

a password input step of entering a print password for permitting printing of the acquired document data, which is inputted by a user; and a printing step of printing the acquired document data when the print password entered by the password input unit is correct, wherein a reading password for permitting opening of the document data stored in the document storing device is given to the document data when generated by the document generating device, wherein before the document data is acquired by the printer from the document storing device via the network, the printer performs an automatic input of the reading password to open the document data stored in the document storing device, and wherein the reading password is prespecified between the printer and the document generating device.

5. The printing method according to claim 4 wherein the document data transmitting step is provided to transmit the document data to the document storing device periodically.

6. The printing method according to claim 4 wherein the document data transmitted in a communication path between the document generating device and the document storing device, and the document data transmitted in a communication path between the document storing device and the printer are enciphered.

7. A computer-readable medium for causing a computer to execute the printing method according to claim 4.

* * * * *